United States Patent [19]

Heilweil

[11] Patent Number: 4,609,476

[45] Date of Patent: Sep. 2, 1986

[54] HIGH TEMPERATURE STABLE AQUEOUS BRINE FLUIDS

[75] Inventor: Israel J. Heilweil, Princeton, N.J.

[73] Assignee: Mobil Oil Corporation, New York, N.Y.

[21] Appl. No.: 673,635

[22] Filed: Nov. 21, 1984

Related U.S. Application Data

[63] Continuation-in-part of Ser. No. 490,901, May 2, 1983, abandoned, and Ser. No. 604,669, Apr. 27, 1984, abandoned.

[51] Int. Cl.[4] .......................... C09K 7/02; E21B 43/00
[52] U.S. Cl. .......................... 252/8.55 R; 252/8.514; 524/99; 524/100; 524/104; 524/106
[58] Field of Search ............ 252/8.5 A, 8.5 C, 8.55 R; 524/99, 100, 104, 106

[56] References Cited

U.S. PATENT DOCUMENTS

| | | |
|---|---|---|
| 2,648,647 | 8/1953 | Stanton . |
| 3,629,101 | 12/1971 | Hille . |
| 3,679,000 | 7/1972 | Kaufman . |
| 4,003,838 | 1/1977 | Jackson et al. . |
| 4,045,357 | 8/1977 | Reed . |
| 4,046,197 | 9/1977 | Gruesbeck, Jr. et al. . |
| 4,079,011 | 3/1978 | Tate . |
| 4,103,742 | 8/1978 | Swanson ............... 166/282 |
| 4,293,427 | 10/1981 | Lucas et al. ............ 252/8.5 |
| 4,304,677 | 12/1981 | Stauffer et al. . |
| 4,309,523 | 1/1982 | Engelhardt et al. . |
| 4,317,758 | 3/1982 | Bruning ............... 524/202 |
| 4,317,759 | 3/1982 | Kanda et al. . |
| 4,330,414 | 5/1982 | Hoover . |
| 4,331,543 | 5/1982 | Wilson et al. . |
| 4,396,734 | 8/1983 | Williams et al. ............ 524/89 |

OTHER PUBLICATIONS

"Macromolecules in Solution" by Herbert Morawetz, Interscience Publishers, pp. 81–84, Chap. II.

*Primary Examiner*—Herbert B. Guynn
*Attorney, Agent, or Firm*—Alexander J. McKillop; Michael G. Gilman; Charles J. Speciale

[57] ABSTRACT

An aqueous brine fluid, particularly useful as a drilling fluid, and containing a high salt concentration, a vinyl sulfonate amide copolymer such as a water soluble copolymer of acrylamidomethylpropanesulfonic acid salts, and a thermal stability enhancing additive, is provided. The aqueous brine fluid is particularly useful at elevated temperatures in the range of about 150°–220° C.

42 Claims, 1 Drawing Figure

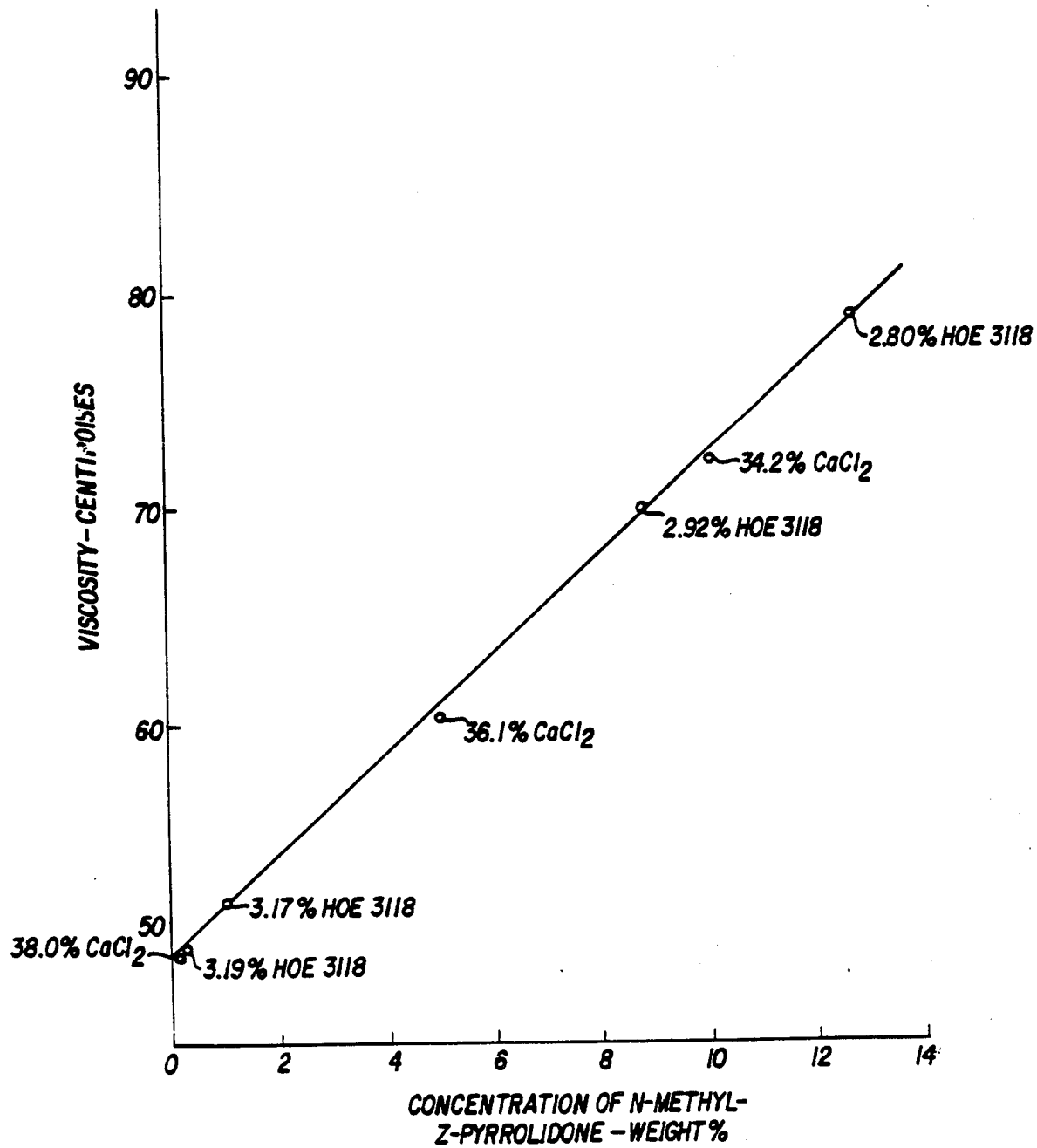

4,609,476

HIGH TEMPERATURE STABLE AQUEOUS BRINE FLUIDS

CROSS-REFERENCE TO RELATED APPLICATIONS

This application is a continuation-in-part of application Ser. No. 490,901, filed May 2, 1983 and application Ser. No. 604,669, filed Apr. 27, 1984, both now abandoned and combines the disclosures thereof.

Co-pending Application Ser. Nos. 413,571, filed Aug. 31, 1982, and 502,054 filed June 7, 1983, now U.S. Pat. No. 4,514,310 in the name of Israel J. Heilweil relates, inter alia, to drilling fluids containing a polyvinylpyrrolidone thickening agent.

Co-pending Application Ser. No. 413,575, filed Aug. 31, 1982, now U.S. Pat. No. 4,498,994 in the name of Israel J. Heilweil relates, inter alia, to drilling fluids containing non-aqueous solvents such as an N-methyl-2-pyrrolidone.

Co-pending Application Ser. No. 454,204, filed Dec. 28, 1982, now U.S. Pat. No. 4,490,261 in the name of Israel J. Heilweil relates, inter alia, to drilling fluids viscosified with basic N-heterocyclic polymers, such as polyvinylpyridine.

Co-pending Application Ser. No. 490,623, filed May 2, 1983, now abandoned in the name of Israel J. Heilweil relates, inter alia, to drilling fluids viscosified with water-soluble copolymers of acrylamidomethylpropanesulfonic acid salts.

The entire disclosures of these above-mentioned U.S. patent applications are expressly incorporated herein by reference.

FIELD OF THE INVENTION

The present invention relates generally to polymers and copolymers in aqueous and polar-organic mixtures, and specifically to high temperature stable viscosified brine drilling fluid systems for use in oil and gas recovery and other industrial applications. These drilling fluids have a high salt concentration and are enhanced in viscosity and thermal stability by the use of additives.

BACKGROUND OF THE INVENTION

Substantial future oil well drilling will be at depths between 15,000 and 30,000 feet where temperatures encountered can be 220° C. Drilling fluids must be tailored to accommodate the nature of the formation stratum being encountered at the time. When the drilling reaches the producing formations, special concern is exercised. Preferentially, low solids content fluids are used to minimize possible productivity loss by solids plugging, enhance drilling rate and reduce sedimentation in inclined wells. Proper fluid density for balancing formation pressure may be obtained by using high salt concentration aqueous brines, while viscosity and filter loss control may be obtained by polymer addition.

The high temperatures, coupled with the desire for low solids content and preferably minimum added solids, require brine tolerant and high temperature stable polymers for viscosity and filtration control.

Current high density, clear brine systems utilize hydroxyethyl cellulose polymers and related materials as viscosifiers, but these are normally unstable at about 135° C., and tend to cross-link and gel with time and temperature, thus causing various drilling operational problems.

In drilling for oil and gas, such as the Mobile Bay and Arun fields, the use of clear brine completion, workover, and packer fluids containing divalent calcium and zinc, can lead to precipitation of carbonates, plugging of wells, and subsequent loss of hydrocarbon productivity. Sodium bromide brines provide a possible alternative. Until the present, however, the use of clear brine fluids has not been fully developed because of the unavailability of viscosifying agents and additives to provide suitable rheological properties for removal of drilled solids and to minimize filtration losses. In addition, it is generally difficult to predict what effect the brine, particularly high concentrations thereof, will have on the thermal properties of the polymer.

Viscosifier/brine systems, which are stable in a 150°–220° C. range, and are suitable for high temperature, deep-drilling operations for oil and gas, oil recovery and other possible applications are known to the art. For example, U.S. patent application Ser. Nos. 490,901 and 490,623 disclose the addition of N-methylpyrrolidone in order to enhance the thermal stability of a vinyl sulfonate amide copolymer in a dense sodium bromide brine at 220° C. However, a relatively high dosage of the added N-methylpyrrolidone is required. Additionally, U.S. Pat. No. 4,309,523 to Engelhardt et al, the entire disclosure of which is expressly incorporated herein by reference, describes drilling muds, i.e., drilling fluids which contain clay, water-soluble copolymers of acrylamidomethylpropanesulfonic acid salts and other components, such as salts, but does not refer to clear brine.

Thus, although some form of thermal stability of brine fluids has been found in the 150°–220° C. range, there is room for improvement. It is therefore an object of the present invention to provide an improved aqueous brine fluid particularly for use as a completion, workover, packer and drilling fluid.

Further, it is an object of this invention to overcome the deficiencies of the prior art.

It is another object of this invention to increase the thermal stability of polymeric viscosifiers in brine drilling fluids at high temperatures, e.g., in the range of 220° C.

It is still another object of this invention to provide an aqueous brine fluid with enhanced thickening characteristics.

It is a further object of this invention to provide an aqueous brine fluid which is economically more desirable.

Additionally, it is an object of this invention to provide new and superior additive systems for brine fluids containing vinyl sulfonate amide copolymers.

Still further, it is an object of this invention to produce a new and improved aqueous brine fluid by the use of additives which increase the thermal stability of the brine fluid without having to chemically alter the brine fluid system.

These and other objects will become apparent from the specification which follows.

SUMMARY OF THE INVENTION

According to one aspect of this invention, there is provided an aqueous brine fluid comprising:

(a) a densifying amount of a densifying salt sufficient to densify the aqueous brine fluid, said densifying salt constituting at least about 30% by weight of said fluid;

(b) a vinyl sulfonate amide copolymer in an amount from about 3% to about 5% by weight of said fluid; and (c) at least one thermally stable enhancing additive, said additive comprising at least one unit of the following formula

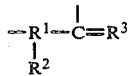

wherein
R$^1$ is N or P;
R$^2$ is H, alkyl, aryl, alkyl amine or their derivatives; and
R$^3$ is O or S; wherein said additive constitutes from about 1% by weight to about 5% by weight of the fluid.

According to another aspect of the invention, there is provided a method for enhancing the thermal stability of an aqueous brine fluid, said method comprising combining with said brine fluid a thermally stable enhancing additive as described above in (c).

According to another aspect of the invention, there is provided a high temperature stable viscosified brine drilling fluid comprising the components disclosed above in (a), (b) and (c).

According to still another aspect of this invention, there is provided an aqueous brine fluid comprising:

(i) a viscosity increasing amount of one or more water-soluble copolymes of acrylamidomethylpropanesulfonic acid salts, consisting essentially of a random distribution of
(a) 5 to 95% by weight of units of the formula

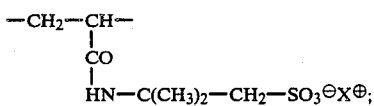

(b) 5 to 95% by weight of units of the formula

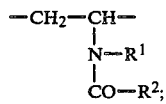

and
(c) 0 to 80% by weight of units of the formula

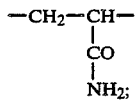

wherein R$^1$ and R$^2$ are the same or different and each is hydrogen, methyl or ethyl; and X$^\oplus$ is a cation;
(ii) a densifying amount of a densifying salt sufficient to densify said fluid, said densifying salt constituting at least about 30% by weight of said fluid; and
(iii) a thermal stability enhancing amount of N-methyl-2-pyrrolidone.

Still further, there is provided a method for increasing the viscosity and thermal stability of an aqueous brine fluid, said method comprising combining with said brine fluid a viscosity increasing amount of one or more water-soluble copolymers of acrylamidomethylpropanesulfonic acid salts, consisting essentially of a random distribution of (a) 5 to 95% by weight of units of the formula

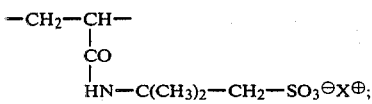

(b) 5 to 95% by weight of units of the formula

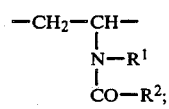

and
(c) 0 to 80% by weight of units of the formula

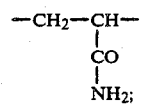

wherein R$^1$ and R$^2$ are the same or different and each is hydrogen, methyl or ethyl; and X$^\oplus$ is a cation; and a thermal stability enhancing amount of N-methyl-2-pyrrolidone.

There is also provided a method for flushing potentially formation-damaging materials comprising cuttings and clays from a wellbore prior to perforation of a well, said method comprising injecting a completion fluid through the drill pipe of said wellbore and recirculating said completion fluid to the surface in the annular area between the wellbore wall and the drill string, wherein said completion fluid is heated to a maximum temperature of between 135° to 170° C. during said method, and wherein said completion fluid comprises an aqueous brine viscosified with a viscosity increasing amount of one or more watersoluble copolymers of acrylamidomethylpropanesulfonic acid salts, consisting essentially of a random distribution of (a) 5 to 95% by weight of units of the formula

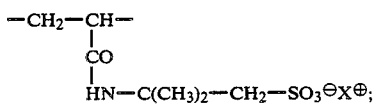

(b) 5 to 95% by weight of units of the formula

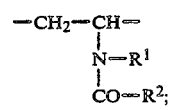

and
(c) 0 to 80% by weight of units of the formula

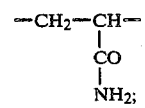

wherein $R^1$ and $R^2$ are the same or different and each is hydrogen, methyl or ethyl; and $x^\oplus$ is a cation; and a thermal stability enhancing amount of N-methyl-2-pyrrolidone.

BRIEF DESCRIPTION OF THE DRAWINGS

The drawing is a plot of viscosity versus concentration for a CaCl$_2$ brine solution in which increasing amounts of N-methyl-2-pyrrolidone are added.

DETAILED DESCRIPTION OF THE INVENTION

The present invention is designed to be used in the exploration and the production of new oil and gas, especially in hot/deep formations, e.g. Mobile Bay. Additionally, it is believed that the present invention is applicable to other industrial processes and operations, e.g., oil recovery, desalinization, etc., where high temperatures in brines are encountered. Further, the present invention can be extended to a wide range of polymers and copolymers in aqueous and polar-organic solvents, as well as to solid and composite polymer and copolymer systems containing polar groups.

The present invention applies to thermal stability enhancing additives containing one or more units of the following group:

$$R^1-\underset{R^2}{\overset{|}{C}}=R^3$$

in a single or multi-cyclic structure in which $R^1$ may be either N or P; $R^2$ may be H, alkyl, aryl, alkyl amines or their derivatives, and $R^3$ may be either O or S. Significantly, the amount of additive necessary for producing the novel aqueous brine fluid described herein is comparatively low, i.e., from about 0.1% to about 5% by weight of the fluid. Examples of such additives are identified by the following table:

TABLE 1

| Thermal Stability Enhancing Additive | |
|---|---|
| NAME | STRUCTURE |
| N—methyl-2-pyrrolidone | 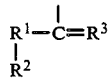 |
| 1-methyl-2-pyridone | |
| N,N'—dimethyl-propylene area (Aldrich 25, 156-9) | |

TABLE 1-continued

| Thermal Stability Enhancing Additive | |
|---|---|
| NAME | STRUCTURE |
| N(N,N—dimethylamino)-propyl-2-pyrrolidone (GAF) | CH$_2$CH$_2$CH$_2$N(CH$_3$)$_2$ |
| N—methyl caprolactam | |
| Hydantoin | |

Other additives are exemplified by derivatives of thiourea, caffeine and thymine which may contain polar solubilizing groups, such as SO$_3-$, NO$_3-$, OH, N, O, COOH, esters, and halogens.

Regarding the brine fluid, high density, aqueous brine completion, workover, and packer fluids have become recognized in the last few years for their effectiveness in minimizing formation damage and providing wellbore stability, as well as in establishing and maintaining high productivity of oil and gas wells, G. Poole, *Oil and Gas. J.*, July 13, 1981, p. 151; D. Acosta, Ibid., Mar. 2, 1981, p. 83; R. J. Spies et al, SPE 9425, September 1980.

Specifically, high density brine fluids are solutions containing 10 to 60% by weight of salts, such as CaCl$_2$, NaBr, NaCl, KSCN, CaNO$_3$, ZnCl$_2$, ZnBr$_2$, CaBr$_2$, KI, LiCl, CaI$_2$, Ca(SCN)$_2$ and their mixtures, having densities up to about 2.4 g/cc (about 20 lbs/gal). Their high salt content prevents swelling and dispersion of formation clays and shales by favorable ion exchange and osmotic pressure reduction. Their high densities provide sufficient hydrostatic head-to-balance formation pressures and thus prevent the influx of undesirable fluids into wells during drilling. Because they are free of dispersed solids, the high density fluids are particularly noted and have potential for prevention of formation plugging, high hydrocarbon recovery, efficient bottom-hole cleaning, enhanced drilling rate and prevention of sediment formation in inclined wells.

With current accelerated efforts to discover new oil in gas deposits by deep drilling, e.g., 15,000 feet, it has become recognized that future developments in drilling fluid technology must make use of viscosifiers, fluid loss control agents, and other additives that are capable of satisfactory performance at high temperatures (greater than 135° C.) and high pressures (greater than 5,000 psi).

With regard to the vinyl sulfonate amide copolymer viscosifiers, it is preferred to use a water-soluble copolymer of acrylamidomethylpropanesulfonic acid salt, which consists essentially of a random distribution of
(a) 5 to 95% by weight of units of the formula

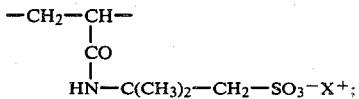

(b) 5 to 95% by weight of units of the formula

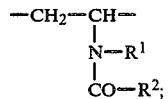

and (c) 0 to 80% by weight of units of the formula

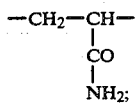

wherein $R^1$ and $R^2$ are the same or different and each is hydrogen, methyl or ethyl; and $X^\oplus$ is a cation.

Such copolymers are described in the previously-mentioned Englehardt et al U.S. Pat. No. 4,309,523 and preferably have a molecular weight of at least 10,000.

One or more water-soluble copolymers of acrylamidomethylpropanesulfonic acid salts are added to aqueous high brine content solutions (e.g., 30–60 wt % salt) providing a liquid of substantially enhanced viscosity which is particularly suitable for use in oil well drilling operations. The use of such polymers results in improved resistance to viscosity loss at elevated temperatures (e.g., more than about 300° F.) compared to conventional viscosity building water/brine soluble polymers and thus is useful in drilling operations involving deep wells. They may also provide some filtration control properties, reducing fluid loss into, and possible damage to, the oil bearing formation.

The effectiveness of -N-methyl-2-pyrrolidone is believed to be due to its multi-functional properties as a buffering agent, as a molecule capable of complexing metal ions, e.g., Fe, Cr, Cu, Mn, etc., that otherwise could lead to catalytic decomposition of copolymers, and as a peroxy radical terminator. In this connection, it has been reported in U.S. Pat. No. 4,317,759 to Kanda et al that the thermal stability of amide-containing polymers is enhanced by incorporation of synergistic combinations of mercaptobenzoimidazole and phenyl derivatives during dissolution or synthesis.

Quite surprisingly, it has now been discovered that the thermal stability enhancing additives of the present invention enhances the thermal stability of a vinyl sulfonate-amide copolymer, e.g., HOE 3118, in a dense brine fluid at low dosages and without necessitating complex chemical reactions. The additives are particularly effective for $CaCl_2$ (11.2 lbs/gal) and NaBr (12.5 lbs/gal) brines. The effective dosage for the thermal stability enhancing additive ranges from about 1 to about 5% of the weight of the brine fluid, and preferably is about 3% of the weight of the brine fluid.

The present invention will be explained further by means of the following examples, which are not meant to limit the invention.

EXAMPLES

Vinyl sulfonate amide copolymers (HOE 3118 and 2825, Hoechst Corp.) will viscosify NaBr and $CaBr_2$ dense, clear brine drilling fluids (about 50% salt, 12.5 and 14.5 lbs/gal, respectively) and retain their viscosifying properties, especially with the case of HOE 3118, in about 175°–200° C. range. By comparison, currently employed cellulosic viscosifiers become ineffective below 135° C. $C^{13}$ NMR analysis of HOE 3118 showed this copolymer to be composed of 62% 2-acrylamido-2-methylpropane-3-sulfonate and 38% N-vinyl-N-methyl-acetamide monomers. The 38% by weight $CaCl_2$ brine (11.2 lbs/gal, 5.9 cp at 25° C.) used in the Table 5 was a laboratory sample prepared from anhydrous $CaCl_2$ (J. T. Baker) in distilled water, and filtered through Whatman #42 filter paper. The final brine solution was made up by adding the polymer particles at a rate of 0.1 g/min/100 g solution into the surface of the liquid vortex generated by a magnetic stirrer. Occasionally, additional shaking of the solution for 1–4 hours was required to complete the process. Dissolved air was not removed, and the initial solution pH and the pH after heating was about 6–7.

In static aging tests, about 3 ml of 1.5% by weight polymer solution were placed in an open pyrex cup and inserted into the interior of a T-type Swagelok filter, Model Nupro TF, made of 316 stainless steel and capable of withstanding 6,000 psi. The securely tightened assembly was then placed in an oven at a given temperature for up to 16 hours. Before and after placing the assembly in the oven, the cup and its contents and the total assembly were weighed so as to detect any leakage.

After cooling the assembly at room temperature, 1 ml of solution was removed, and its viscosity determined with a Brookfield LVD cone and plate viscometer maintained at 25° C., covering the general shear rate region between 2 and 50 $\sec^{-1}$. Results were compared with initial values at 25° C. prior to aging. (Note: The ability of a fluid to suspend particles, which is essential to drilling fluid performance, is believed to be related to viscosity at 7 $\sec^{-1}$.)

Table 2 summarizes 16 hour static aging experiments with 5.0 wt % HOE 3118 and 2825 in NaBr brine (12.5 lbs/gal) up to 176° C. and demonstrates little or no degradation for HOE 3118; HOE 2825 is stable up to about 150° C. At 200° C. (see Table 3) HOE 3118 retains its viscosifying properties for at least 4 hours. (The deviations are within experimental error.) After 16 hours heating at 200° C., the viscosity of HOE 3118 is decreased by 23%, but the inclusion of 0.6 wt % of N-Methyl Pyrrolidine as an additive improves the performance. Table 4 describes 16 hour static aging experiments of HOE copolymers in $CaBr_2$ (14.5 lbs/gal) and West Burkburnette (WBB) brines. The WBB brine contains 13 wt % NaCl, 3.45 wt % $CaCl_2.H_2O$ and 1.5 wt % $MgCl_2.6H_2O$. The WBB experiment relates to the ability of HOE 3118 to function as a mobility control agent. In $CaBr_2$ brine HOE 3118 is stable up to about 175° C.

TABLE 2

NaBr BRINE (12.5 lbs/gal)
5% VINYL AMIDE - VINYL SULFONATE POLYMERS
STATIC AGING FOR 16 HOURS

| | HEATING TEMP., °C. | APPARENT VISCOSITY, CP AT 25° AND 11.5 SEC$^{-1}$ | | |
|---|---|---|---|---|
| | | BEFORE | AFTER | % CHANGE |
| HOE 3118 | 90 | 38.0 | 37.5 | −1.3 |
| | 150 | 38.0 | 37.0 | −2.6 |
| | 176 | 35.5 | 36.5 | +2.8 |
| HOE 2825 | 90 | 99.5 | 97.5 | −2.0 |
| | 150 | 99.5 | 96.0 | −3.5 |
| | 169 | 92.0 | 55.5 | −40.0 |

TABLE 3

AGING EXPERIMENTS OF 5.0 wt % HOE 3118
IN NaBr (12.5 lbs/gal) at 200° C.
Apparent Viscosity, cp, at 25° C. and 23 sec$^{-1}$

| BEFORE HEATING | HEATING DURATION | AFTER HEATING | % CHANGE |
|---|---|---|---|
| 35.0 (cp) | 3 (hrs) | 32.5 (cp) | −7.1 |
| 35.0 | 4.3 | 31.0 | −11.0 |
| 35.0 | 16 | 27.0 | −23.0 |
| With 0.6 wt % N—Methyl Pyrrolidone | | | |
| 35.5 (cp) | 3 | 37.0 | +4.2 |
| | 4 | 39.0* | +9.9 |
| | 16 | 30.0 | −15.5 |

*1 hour at 206° C.

TABLE 4

Viscosities of 2% by wt HOE 2825 and 3118
Before and After 16 Hours Heating

| | Medium | Temp. °C. | Apparent viscosity at 25° C., cp$^{(a)}$ | | |
|---|---|---|---|---|---|
| | | | Before | After | % Change |
| HOE 3118 | CaBr$_2$ | 175 | 29.3* | 34.8 | +16 |
| | WBB | 125 | 4.9 | 4.2 | −14 |
| | | | 10.7$^{(b)}$ | −9.7$^{(b)}$ | −9$^{(b)}$ |
| HOE 2825 | CaBr$_2$ | 175 | 33.3* | Gel | |
| | WBB | 125 | 5.5 | 3.2 | −42 |

$^{(a)}$All data at 115 sec$^{-1}$, except at 46 sec$^{-1}$ when indicated by *.
$^{(b)}$4% HOE in WBB.

Table 5 summarizes 16 hours static aging experiments with 3.2% by weight HOE 3118 viscosifier in CaCl$_2$ (11.2 lbs/gal) at 220° C., and shows that additives 2–5 significantly enhance the thermal stability of the copolymer solutions when compared to the control system (Item 1). From Table 5, it can be seen that additive 2 at 3% by weight completely stabilizes the copolymer for 5 hours. Additive 3, at 1% by weight, retains the viscosity to within 17% after heating up to 16 hours. Additive 4, at 3% by weight, retains the viscosity to within 6% after 8 hours heating, which is close to the error of measurements (about 5–10%); and after 16 hours of heating, the lowering of viscosity is only about half that which occurs without the additive. It should be apparent that additives 2, 3 and 4 enhance the viscosity above that of the control system 1 by 9–20%. Additive 5 shows good thermal stabilization for 16 hours but does not enhance viscosity. The slight turbidity is indicative of a borderline solubility at room temperature. However, it is believed that this additive is soluble and quite active at elevated temperature and that turbidity would be eliminated and/or decreased with derivatives containing shorter chain amines.

It should be pointed out that adding increasing amounts of the thermal stability enhancing additive to the brine solution will increase the viscosity, which could lead to cost/performance advantages. The drawing is a plot showing the viscosity versus concentration for N-methyl-2-pyrrolidone (additive 2) in a calcium chloride-HOE 3118 brine solution. The drawing shows that viscosity increases as the concentration of additive 2 increases and the concentration of calcium chloride and HOE 3118 subsequently decreases. The same may be true for additives 3 and 4.

TABLE 5

Aging Experiments of 3.2 wt % of HOE 3118
Viscosifier In CaCl$_2$ (11.2 lbs/gal) at 220° C.

| Additive | wt % | Apparent viscosity, cp, at 25° C. and 46 sec$^{-1}$ after heating at 220° C. | | | |
|---|---|---|---|---|---|
| | | Original | 5 hrs | 8 hrs | 6 hrs |
| (1) No additive | 0.0 | 48.0 | 35.0 (27)$^{(a)}$ | 31.0 (35) | 20 (58) |
| (2) N—methyl-2-pyrrolidone | 3.0 | 58.0 | 58.0 (0) | 25.0 (56) | 20 (65) |
| (3) 1-methyl-2-pyridone | 1.0 | 53.0 | —$^{(b)}$ | 44.9 (15) | 43.0 (19) |
| (4) DMPV | 3.0 | 55.0 | — | 51.4 (6.5) | 40.0 (27) |
| (5) N—(N—N—dimethyl amino)-propyl-2-pyrrolidone | 3.0 | 42.0$^{(c)}$ | — | —$^{(d)}$ | 35.5$^{(c)}$ (16) |
| (6) N—methyl caprolactam | 3.0 | 42.3 | — | 35$^{(e)}$ | —$^{(f)}$ incipient gelation |
| (7) Hydantoin | 3.0 | 42.3 | — | 33$^{(e)}$ ppt$^{(g)}$ | 27.5 ppt |

$^{(a)}$% change after heating from original
$^{(b)}$Viscosity not measured at 5 hours
$^{(c)}$Slightly turbid
$^{(d)}$Viscosity not measured at 8 hours
$^{(e)}$12 hours at 220° C.
$^{(f)}$Viscosity not measured at 16 hours
$^{(g)}$ppt = Precipitates out The experimental procedure leading to the results in Table 5 was used for the following experiments. Table 6 demonstrates that hydantoin (additive 7) at 3% by weight is a more effective additive than N-methyl-2-pyrrolidone at 9% by weight, when added to 5% by weight HOE 3118 in NaBr brine (12.5 lbs/gal), and heated at 220° C. for periods up to 16 hours. Hydantoin, as noted in Table 5, precipitates out in CaCl$_2$ brine upon heating, but retains its solubility in NaBr.

TABLE 6

Aging Experiments of 5 wt % HOE 3118 in NaBr (12.5 lb/gal) at 220° C.

| Additive | wt % | Apparent Viscosity, cp, at 25° C. and 46 sec$^{-1}$ after heating at 220° C. | | |
|---|---|---|---|---|
| | | Original | 8 hrs | 16 hrs |
| No additive[a] | 0.0 | 55.0 | 29.0 (47)[c] | 20 (64) |
| N—methyl-2-pyrrolidone (MP) | 9.0 | 68.0 | 50.0 (27) | 41.0 (40) |
| No additive[b] | 0.0 | 63.0 | 39.0 (38) | 15.6 (75) |
| Hydantoin[b] | 3.0 | 64.0 | 60.0 (6) | 42.0 (34) |

[a] and [b] refer to different brine preparations
[c] % change after heating from original The aqueous brine fluids of the present invention are felt to be useful in formations having temperatures in the range of 150°–220° C.

The embodiments of the Examples herein provide information and directions for other clear brines, polymers, and additives for high density, multifunctional fluids for deep well drilling. Here are some examples: increasing M.W. to reduce the polymer content and hence cost; extending the system to include other highly temperature stable polymers; selecting other high density brines and brine mixtures, e.g., brines containing LiCl, CaI$_2$, Ca(SCN)$_2$, etc., with and without admixture of suitable solubilizing surfactants; selecting polar and hydrocarbon-derived solvents instead of water (note applicant's copending U.S. application Ser. No. 413,575, filed Aug. 31, 1982); in situ polymerization of monomers in wells and in gas and oil formations containing highly concentrated brines, etc.

The viscosity increasing amount of polymer used in accordance with aspects of the present invention is that amount which is sufficient to achieve the desired viscosifying functions. In drilling, these functions involve transportation of cuttings to the surface and suspension of solids when the drilling fluid is not being circulated. The use of a viscosity increasing amount of polymer may result in an increase in viscosity at room temperature of a factor of, e.g., at least 4. In other terms, the amount of water-soluble copolymer of acrylamidomethylpropanesulfonic acid salts employed may be, e.g., about 0.5–10% by weight or as exemplified in the foregoing Examples from about 2 to about 5% by weight of the fluid.

The salinity of the aqueous brine drilling fluid in accordance with aspects of the invention may be from at least 30% by weight up to the salt saturation point of the fluid, which is generally about 60–65% by weight. The brine fluids of the present invention may have a density of, e.g., from about 12 to about 16 pounds per gallon.

Although the viscosifying effect of water-soluble copolymers of acrylamidomethylpropanesulfonic acid salts in accordance with aspects of the present invention is particularly useful in fluids for drilling in the vicinity of oil or gas producing formations, this effect may also be used when drilling in areas other than in the vicinity of oil or gas formations. Thus, viscosified drilling fluids containing water-soluble copolymers of acrylamidomethylpropanesulfonic acid salts may also contain constituents other than water and brine, such as filter loss control solids in an amount sufficient to prevent loss of fluid to the formation.

Viscosified aqueous brine fluids containing water-soluble copolymers of acrylamidomethylpropanesulfonic acid salts are felt to be useful in formations having a temperature of at least 300° F. (e.g., 300°–450° F.). Such temperatures may occur at drilling depths of at least 15,000 feet (e.g., 15,000–30,000 feet).

The drilling fluids of the present invention preferably do not contain thermally unstable polymeric thickeners, such as starch, carboxymethyl cellulose, and modified polyacrylates.

Although fluids of the present invention may be used while drilling is occurring, they may also be used in other aspects of drilling operations. For example, these fluids may be used as completion, packer and workover fluids. Completion fluids are those used to flush potentially formation-damaging materials, e.g., cuttings and clays, from the wellbore prior to perforation. Packer fluids are left in the annulus, between casing and tubing, when the well is placed on production. Workover fluids, frequently clear brines, are used in cleaning and repairing old wells to increase productivity.

Particularly in the above-mentioned drilling operations, the viscosified fluids described herein may be used at elevated temperatures. The HOE 3118 brine solutions with the additives of the present invention are felt to be thermally stable for long periods of time at temperatures up to and including 220° C. By way of contrast, conventionally employed cellulosic polymer viscosifiers decompose below 135° C. Accordingly, brines as described herein are particularly useful in operations wherein the fluid is heated to temperatures above about 135° C.

Although the aqueous brine fluids of the present invention have been described herein primarily with respect to their use as fluids in drilling operations, it will be understood that these fluids may also be quite useful in other fields. More particularly, these fluids should be applicable to a wide range of industrial applications, e.g., in processing minerals from salty solutions, in the production of speciality coatings, polymers, fibers, and membranes, in the formulation of "synthetic" water-based pneumatic fluids and novel lubricants, and in light energy conversion based on heat transport between concentrated and less concentrated brine layers in ponds.

Although the invention has been described in conjunction with specific embodiments thereof, it is evident that many alternatives and variations will be apparent to those skilled in the art in light of the foregoing description. Accordingly, the invention is intended to embrace all of the alternatives and variations that fall within the spirit and scope of the appended claims.

I claim:

1. An aqueous brine fluid comprising:
   (i) a viscosity increasing amount of one or more water-soluble copolymers of acrylamidomethylpropanesulfonic acid salts, consisting essentially of a random distribution of
   (a) 5 to 95% by weight of units of the formula

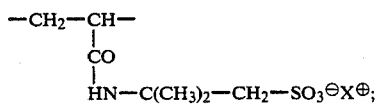

(b) 5 to 95% by weight of units of the formula

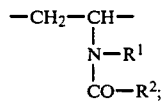

and (c) 0 to 80% by weight of units of the formula

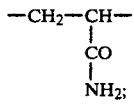

wherein $R^1$ and $R^2$ are the same or different and each is hydrogen, methyl or ethyl; and $X^\oplus$ is a cation;

(ii) a densifying amount of a densifying salt sufficient to densify said fluid, said densifying salt constituting at least about 30% by weight of said fluid;

(iii) a thermal stability enhancing amount of N-methyl-2-pyrrolidone.

2. A fluid according to claim 1, wherein the amount of said salt is from about 50% by weight of said fluid up to the salt saturation point of said fluid.

3. A fluid according to claim 1, wherein said viscosity increasing amount is sufficient to increase the viscosity of said brine fluid by a factor of at least 4 at room temperature.

4. A fluid according to claim 3, wherein said salt is selected from the group consisting of $CaCl_2$, NaCl, KSCN, $CaNO_3$, $ZnCl_2$, $CaBr_2$, NaBr, KI, LiCl, $CaI_2$, $Ca(SCN)_2$ and mixtures thereof.

5. A fluid according to claim 3, wherein said salt is NaBr.

6. A fluid according to claim 1, which is a drilling fluid.

7. A fluid according to claim 1, which does not contain clay.

8. A fluid according to claim 1, which is a completion fluid for flushing potentially formation-damaging materials comprising cuttings and clays from the wellbore prior to perforation.

9. A fluid according to claim 1, which is essentially solids-free.

10. A fluid according to claim 1, wherein said water-soluble copolymers have a molecular weight of at least 10,000.

11. A fluid according to claim 1, which is a workover fluid.

12. A fluid according to claim 1, which is a packer fluid.

13. A method for increasing the viscosity and thermal stability of an aqueous brine fluid, said method comprising combining with said brine fluid a viscosity increasing amount of one or more water-soluble copolymers of acrylamidomethylpropanesulfonic acid salts, consisting essentially of a random distribution of (a) 5 to 95% by weight of units of the formula

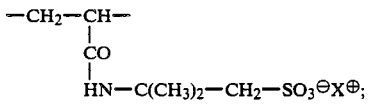

(b) 5 to 95% by weight of units of the formula

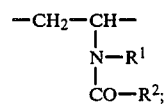

and (c) 0 to 80% by weight of units of the formula

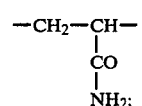

wherein $R^1$ and $R^2$ are the same or different and each is hydrogen, methyl or ethyl; and $X^\oplus$ is a cation; and a thermal stability enhancing amount of N-methyl-2-pyrrolidone.

14. A method according to claim 13, wherein said viscosified brine fluid comprises at least about 30% by weight of salt.

15. A method according to claim 13, wherein said viscosified brine fluid comprises at least 50% by weight of salt.

16. A method according to claim 13, wherein said viscosity increasing amount is sufficient to increase the viscosity of said brine fluid by a factor of at least 4 at room temperature.

17. A method according to claim 14 wherein said salt is selected from the group consisting of $CaCl_2$, NaCl, KSCN, $CaNO_3$, $ZnCl_2$, $CaBr_2$, NaBr, KI, LiCl, $CaI_2$, $Ca(SCN)_2$ and mixtures thereof.

18. A method according to claim 14, wherein said salt is NaBr.

19. A method according to claim 13, wherein said viscosified brine fluid does not contain clay.

20. A method according to claim 14, wherein said viscosified brine fluid is solids-free.

21. A method according to claim 13, wherein said water-soluble copolymers have a molecular weight of at least 10,000.

22. A method for flushing potentially formation-damaging materials comprising cuttings and clays from a wellbore prior to perforation of a well, said method comprising injecting a completion fluid through the drill pipe of said wellbore and recirculating said completion fluid to the surface in the annular area between the wellbore wall and the drill string, wherein said completion fluid is heated to a maximum temperature of between 135° to 220° C. during said method, and wherein said completion fluid comprises an aqueous brine viscosified with a viscosity increasing amount of one or more water-soluble copolymers of acrylamidomethylpropanesulfonic acid salts, consisting essentially of a random distribution of (a) 5 to 95% by weight of units of the formula

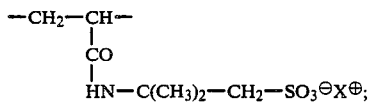

(b) 5 to 95% by weight of units of the formula

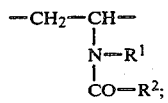

and (c) 0 to 80% by weight of units of the formula

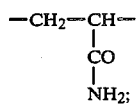

wherein $R^1$ and $R^2$ are the same or different and each is hydrogen, methyl or ethyl; and $X^\oplus$ is a cation; and a thermal stability enhancing amount of N-methyl-2-pyrrolidone.

23. A method according to claim 22, wherein said completion fluid is essentially solids-free and comprises at least 30% by weight of NaBr.

24. A method according to claim 22, wherein said water-soluble copolymers have a molecular weight of at least 10,000.

25. An aqueous brine fluid comprising:
(a) a densifying amount of a densifying salt sufficient to densify said fluid, said densifying salt constituting at least about 30% by weight of said fluid;
(b) a viscosity increasing vinyl sulfonate amide copolymer in an amount from about 3% to about 5% by weight of said fluid, wherein said vinyl sulfonate amide copolymer is a viscosity increasing amount of one or more water-soluble copolymers of acrylamidomethylpropanesulfonic acids salts, consisting essentially of a random distribution of
(1) 5 to 95% by weight of units of the formula

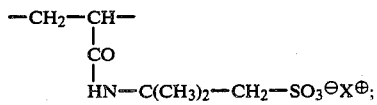

(2) 5 to 95% by weight of units of the formula

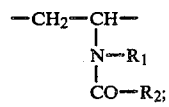

and (3) 0 to 80% by weight of units of the formula

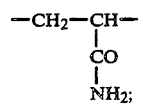

wherein $R_1$ and $R_2$ are the same or different and each is hydrogen, methyl or ethyl; and $X^\oplus$ is a cation; and (c) at least one thermal stability enhancing additive selected from the group consisting of N-methyl-2-pyrrolidone, 1-methyl-2-pyridone, N,N'-dimethyl-propylene urea, N-(N,N-dimethyl-amino)-propyl-2-pyrrolidone, N-methyl caprolactam, and hydantoin, wherein said additive constitutes from about 0.1% by weight to about 5% by weight of said fluid.

26. The fluid according to claim 25, wherein the amount of said salt is from about 50% by weight of said fluid up to the salt saturation point of said fluid.

27. The fluid according to claim 25, wherein said salt is selected from the group consisting of $CaCl_2$, NaBr, NaCl, KSCN, $CaNO_3$, $ZnCl_2$, $ZnBr_2$, $CaBr_2$, KI, LiCl $CaI_2$, $Ca(SCN)_2$, and mixtures thereof.

28. The fluid according to claim 25, wherein said salt is $CaCl_2$.

29. The fluid according to claim 25, wherein said salt is NaBr.

30. The fluid according to claim 25, which is a drilling fluid.

31. The fluid according to claim 25, which is essentially solids free.

32. A method for enhancing the thermal stability of an aqueous brine fluid, said aqueous brine fluid comprising:
(a) a densifying amount of a densifying salt sufficient to densify said fluid, said densifying salt constituting at least about 30% by weight of said fluid;
(b) a viscosity increasing vinyl sulfonate amide copolymer in an amount from about 3% to about 5% by weight of said fluid, wherein said vinyl sulfonate amide copolymer is a viscosity increasing amount of one or more water-soluble copolymers of acrylamidomethylpropanesulfonic acid salts, consisting essentially of a random distribution of
(1) 5 to 95% by weight of units of the formula

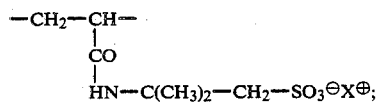

(2) 5 to 95% by weight of units of the formula

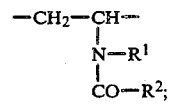

and (3) 0 to 80% by weight of units of the formula

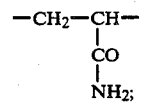

wherein $R^1$ and $R^2$ are the same or different and each is hydrogen, methyl or ethyl; and $X^\oplus$ is a cation; said method comprising combining with said brine fluid from about 0.1% by weight to about 5% by weight of a thermal stability enhancing additive, said additive comprising:

(c) at least one thermal stability enhancing additive selected from the group consisting of N-methyl-2-pyrrolidone, 1-methyl-2-pyridone, N,N'-dimethyl-propylene urea, N-(N,N-dimethylamino)-propyl-2-pyrrolidone, N-methyl caprolactam, and hydantoin.

33. The method according to claim 32, wherein the amount of said salt is from about 50% by weight of said fluid up to the salt saturation point of said fluid.

34. The method according to claim 32, wherein said salt is selected from the group consisting of $CaCl_2$, NaBr, NaCl, KSCN, $CaNO_3$, $ZnCl_2$, $ZnBr_2$, KI, LiCl $CaI_2$, $Ca(SCN)_2$ and mixtures thereof.

35. The method according to claim 32, wherein said salt is $CaCl_2$.

36. The method according to claim 32, wherein said salt is NaBr.

37. A high temperature stable viscosified brine drilling fluid, said fluid comprising:
  (a) a densifying amount of a densifying salt sufficient to densify said fluid, said densifying salt constituting at least about 30% by weight of said fluid;
  (b) a vinyl sulfonate amide copolymer in an amount from about 3% to about 5% by weight of said fluid, wherein said vinyl sulfonate amide copolymer is a viscosity increasing amount of one or more water-soluble copolymers of acrylamidomethylpropanesulfonic acid salts, consisting essentially of a random distribution of
    (1) 5 to 95% by weight of units of the formula

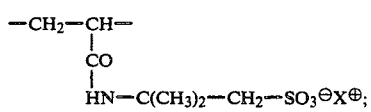

(2) 5 to 95% by weight of units of the formula

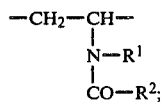

and
    (3) 0 to 80% by weight of units of the formula

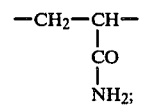

wherein $R^1$ and $R^2$ are the same or different and each is hydrogen, methyl or ethyl; and $X^\oplus$ is a cation;
  (c) at least one thermal stability enhancing additive selected from the group consisting of N-methyl-2-pyrrolidone, 1-methyl-2-pyridone, N,N'-dimethylpropylene urea, N-(N,N-dimethylamino)-propyl-2-pyrrolidone, N-methyl caprolactam, and hydantoin, wherein said additive constitutes from about 0.1% by weight to about 5% by weight of said fluid.

38. The fluid according to claim 37, wherein the amount of said salt is from about 50% by weight of said fluid up to the salt saturation point of said fluid.

39. The fluid according to claim 37, wherein said salt is selected from the group consisting of $CaCl_2$, NaBr, NaCl, KSCN, $CaNO_3$, $ZnCl_2$, $ZnBr_2$, $CaBr_2$, KI, LiCl, $CaI_2$, $Ca(SCN)_2$, and mixtures thereof.

40. The fluid according to claim 37, wherein said salt is $CaCl_2$.

41. The fluid according to claim 37, wherein said salt is NaBr.

42. The fluid according to claim 37, which is essentially solids free.

* * * * *